United States Patent [19]

Nishioka et al.

[11] Patent Number: 4,633,499
[45] Date of Patent: Dec. 30, 1986

[54] SPEECH RECOGNITION SYSTEM

[75] Inventors: Yoshiki Nishioka, Tenri; Mitsuhiro Hakaridani; Hiroyuki Iwahashi, both of Nara, all of Japan

[73] Assignee: Sharp Kabushiki Kaisha, Osaka, Japan

[21] Appl. No.: 433,522

[22] Filed: Oct. 8, 1982

[30] Foreign Application Priority Data

Oct. 9, 1981 [JP] Japan ................................ 56-161399

[51] Int. Cl.[4] .............................................. G10L 1/00
[52] U.S. Cl. ..................................................... 381/43
[58] Field of Search .................... 381/41–43, 381/51–53

[56] References Cited

U.S. PATENT DOCUMENTS

| | | | |
|---|---|---|---|
| 3,624,302 | 11/1971 | Atal | 381/41 |
| 3,634,759 | 1/1972 | Koshikawa et al. | 381/41 |
| 4,214,125 | 7/1980 | Mozer et al. | 381/41 |
| 4,461,023 | 7/1984 | Katayama | 381/43 |

OTHER PUBLICATIONS

Rabiner, et al, "Isolated and Connected Word Recognition", IEEE Trans on Comm's, May 1981, pp. 621, 622, 636.

Primary Examiner—E. S. Matt Kemeny
Attorney, Agent, or Firm—Birch, Stewart, Kolasch & Birch

[57] ABSTRACT

In a speech analysis/recognition system, the input utterance is also directly registered (stored) for later readout verification of correct start and end control signals.

3 Claims, 5 Drawing Figures

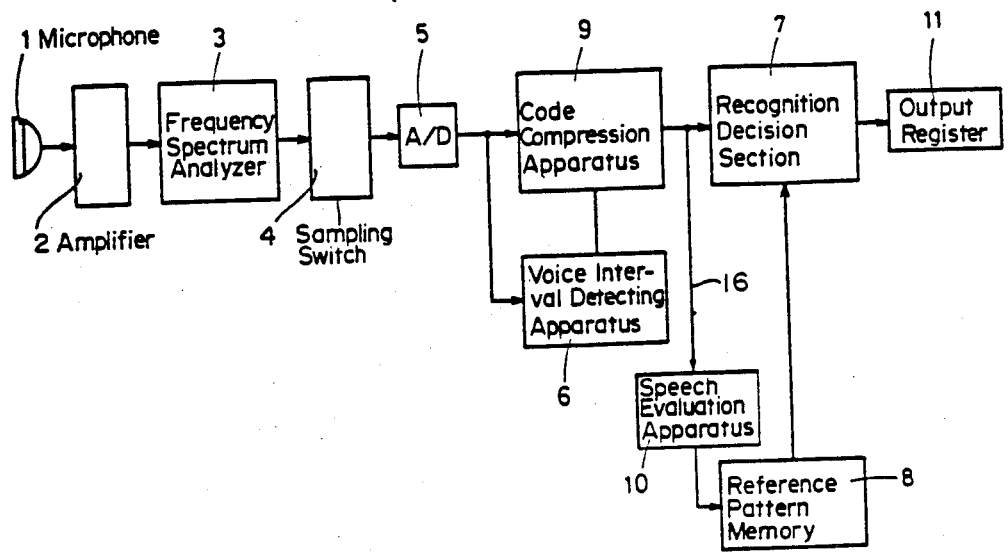
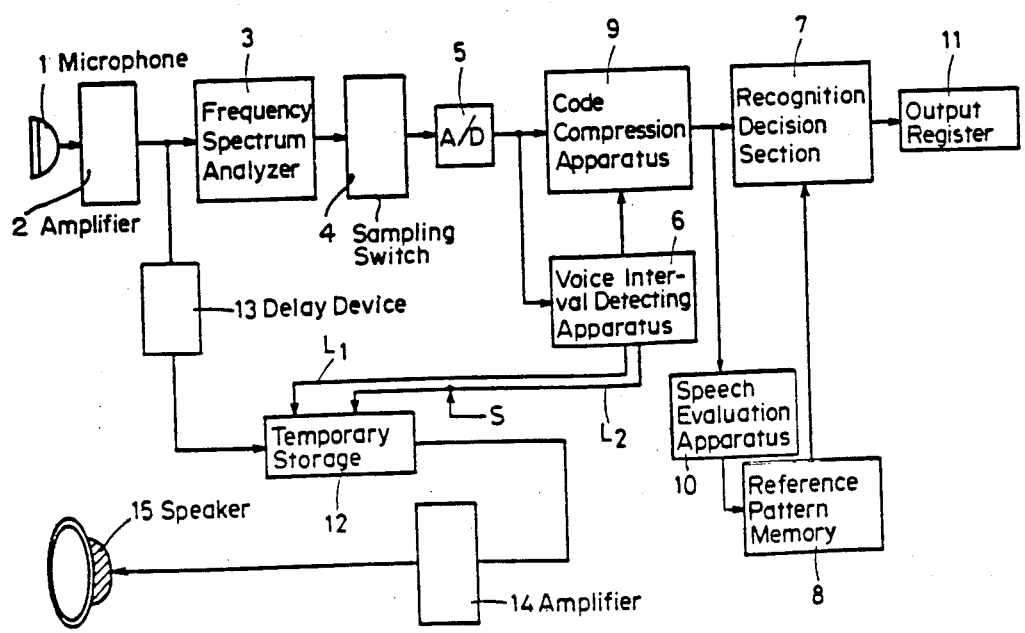

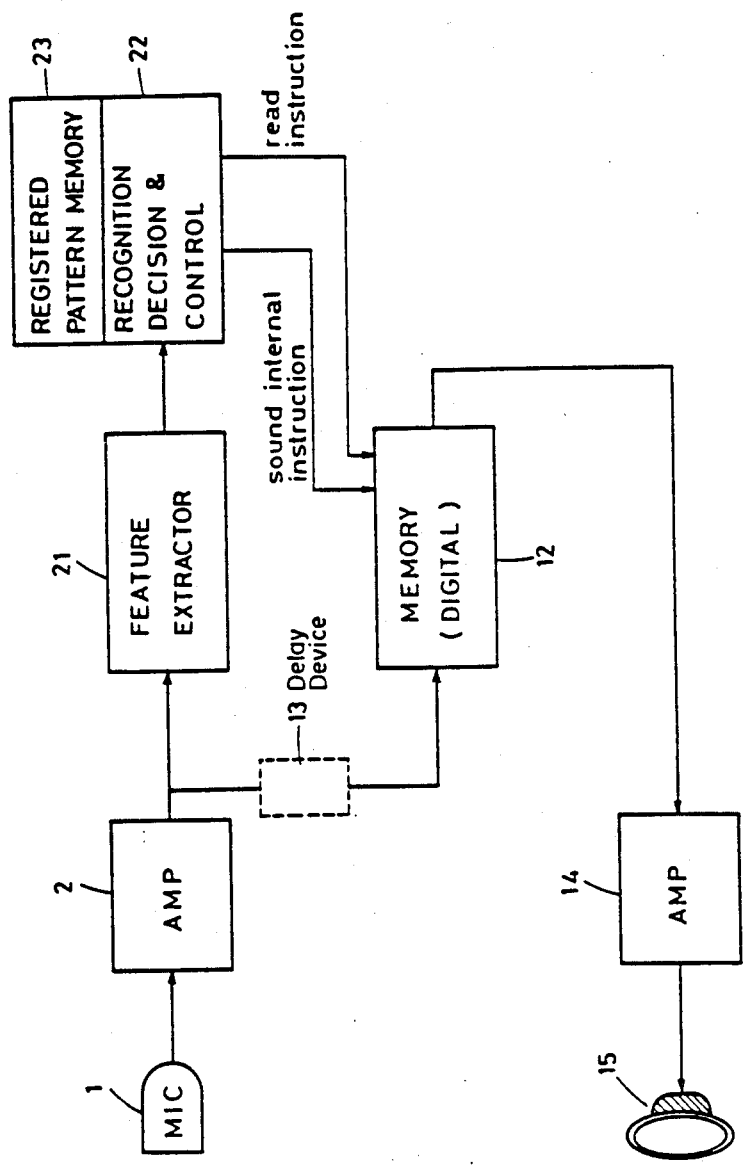

SPEECH RECOGNITION SYSTEM

BACKGROUND OF THE INVENTION

The present invention relates to the improvement of a speech recognition device and in particular to the improvement of a speech recognition device by means of which the specific pattern of the previously registered and recorded voice of a specific speaker, the distinctive features of which have been analyzed and determined, can be unmistakably recognized.

Considerable research has been conducted into speech recognition technology in the past, and a simple form of speech recognition device has been developed which has been able to recognize the vocalization of limited words particularly limited to the most recent utterance, while at the same time recognizing the voice data of the speech of a previous utterance, the distinctive features of which have been registered and recorded. This device is on the way to being put to practical application.

A typical example of this type of speech recognition device is shown in FIG. 1. In FIG. 1., when a voice enters a microphone 1, a voice signal passes from this microphone 1 into an amplifier 2 in which the sound is amplified, after which, by means of a frequency spectrum analyzer 3, where, for example, 16 frequency bands in a row are resolved, then by means of a subsequent switch 4, sampling of the frequency, for example, 100 Hz is carried out, and the result by means of an AD transducer 5 is converted into a digital value of, for example, 8 bits. The output of the AD transducer 5 is entered into a voice interval (voice fields) detecting appratus 6. This voice section detecting apparatus 6 provides initial timing and terminal timing. A recognition decision section 7, into which a reference pattern of perhaps 240 bits is entered from a reference pattern memory 8, compares the input pattern with the reference pattern. Also, the sectioned time region bit pattern from the voice interval detecting apparatus 6 is compressed into, say, 240 bits in a code compression apparatus 9. When the voice which is to be registered speaks, each variation in speech is revised in an evaluation apparatus 10, and an average reference pattern is drawn up, and this reference pattern is entered into a reference pattern memory 8. That is to say, the person whose voice is intended to be recognized speaks the words, etc. which are already capable of being recognized, and this speech is converted into a pattern through the channel, and through the main circuit an investigative action is repeated many times, and the reference pattern which is stored in the reference pattern memory 8 is formed. The recognition decision section 7, on comparing the output pattern from the code compression apparatus 9 with the reference pattern, makes the decision as to which pattern the input voice belongs, and that decision, for instance, the selected reference pattern code number, is set in an output register 11, and the recognition is completed. In this type of conventional speech recognition apparatus, the voice to be registered is simply analyzed, and the distinct features are extracted, and the pattern of the special features which have been extracted is stored in the reference pattern memory (with no additional processing.). Therefore, the speaker can speak properly, but a discordant noise could also be mixed in, and outside of the speaker's intuitive judgement, there is no way of determining whether or not the apparatus can correctly detect the voice intervals. In other words, there is the problem that a correct pattern of the distinctive features of the wave form of the voice being registered, in the case of wave forms such as those shown in FIG. 2(a) to (c), may not be obtained.

The wide, U-shaped bands under the patterns shown in FIG. 2 indicate the voice sections detected by the apparatus, where case (a) is an example of a noise being mixed into the voice wave form of the correct voice sections which were detected; case (b) is an example of the detection of the voice section becoming shortened because the voice intermission (section b-a pause between words) is too long; case (c) is an example of the leading end of the speech being weak, so that that leading end of the voice section is cut off; and case (d) is an example of the detection of the voice section being cut off at the trailing end because of the huskiness of the trailing end.

In these types of examples the lack of correct registration of the distinctive pattern can only be judged intuitively by the speaker himself.

OBJECT OF THE INVENTION

The present invention, taking note of the above problem areas, has as its objective the provision of an apparatus by which it is possible to confirm whether or not the speaker's own intended speech was able to be correctly registered in the speech recognition apparatus. In order to achieve this objective, the speech recognition apparatus of the present invention has a configuration by which, based on the detected signal of the voices interval at the time of registering the pattern of the distinctive features, along with recording the voice data, with temporary recording means, after the speech is finished, the voice data which has been recorded with this temporary recording means, is reproduced by means of a reproduction device.

In the speech recognition apparatus of the present invention, the pattern of distinctive characteristics of the voice which is to be recognized, based on the previously spoken voice data, is extracted and registered. At the time that the distinctive characteristics are registered, based on the recognition signal of the voice intervals, the voice data is temporarily stored in the temporary storage, and at the same time, after the speaking is completed, the voice data stored in the temporary storage is reproduced by the reproduction device. For this reason the speaker is able to know, from the "external noise", the "voice's pause (a pause in the speech interval)", "the weakness of the leading end (start)", and "the huskiness in the trailing end", etc., if the judgment of the voice interval did not take place accurately, making it possible to obtain the voice registration more promptly and reliably.

BRIEF DESCRIPTION OF THE DRAWING

FIG. 1 is a block diagram of the configuration of the conventional apparatus.

FIG. 3 is a block diagram of the configuration of one embodiment of the apparatus according to the present invention.

FIG. 4 and FIG. 5 are theoretical configuration drawings of other embodiments of the apparatus according to the present invention.

DETAILED DESCRIPTION OF THE INVENTION

Figure 2:
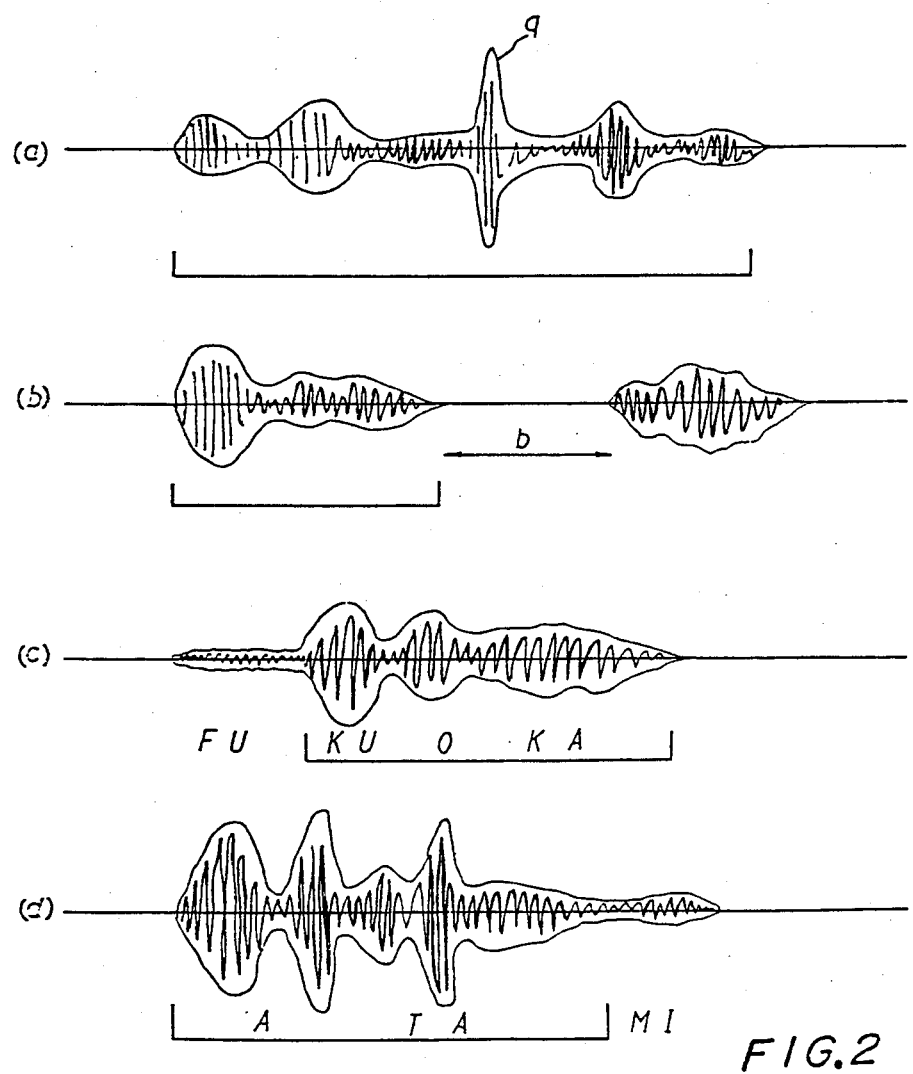
FIG. 2 is a signal wave form diagram showing the measured conditions of the voice interval obtained from the words spoken.

FIG. 3 is a block diagram showing the configuration of one embodiment of the speech recognition apparatus according to the present invention, and shows the identical section with the code identical to that in FIG. 1.

The embodiment shown in FIG. 3 comprises a microphone 1, an amplifier 2, a frequency spectrum analyzer 3, a scanner 4, an analogue-digital (AD) transducer 5, a voice interval detection apparatus 6, a recognition decision section 7, a reference pattern memory 8, a code compressing apparatus 9, an evaluation apparatus 10, and an output register 11. In addition, there is shown a temporary storage device 12 (analogue memory). The input terminal for the above-mentioned temporary storage device 12, is either directly connected, or is connected to the output terminal of the amplifier 2 through a delay device 13. In addition, the output terminal of the temporary storage device 12 is connected to the amplifier 14 through the reproduction device (speaker) 15. Furthermore, the detection signal of the voice interval detection apparatus 6 passes through a line L1 to the temporary storage device 12, where it receives a signal, and in addition, the read-out signal from the voice interval detection apparatus 6 passes through line L2, and the final measured results of the voice interval are received in the temporary storage device 12 after a fixed elapsed time. In addition, the operating signal S from the operating switch, as a read-out signal, becomes the configuration given in the temporary storage device.

The delay device 13 is set up to store the voice data corresponding to the beginning of the voice interval from the voice interval detection apparatus 6, corresponding to the measured timing of the voice interval, and for signal processing in the case where there is no time delay in the analyzer 3, scanner 4 and AD transducer 5, it is not particulary necessary.

With a configuration like that described above, the voice data from the marked-off time span is stored in the temporary storage device 12, from the voice interval signal, and the results measured from the end of the voice interval, corresponding to the contents of that storage device, are output as voice from the speaker 15. Therefore, it becomes possible for the speaker to verify by ear the voice data from the voice interval and the decision interval, and, when, as in the example in FIG. 2, there is noise mixed in with the voice input which it is desired to register, it is possible to verify the output by listening to the reproduction from the speaker, and repeat the registration operation.

In the example given in FIG. 2(b), although the speaker is saying the word "ATAMI", because the trailing end is cut off the word registered in the temporary storage device 12 is simply "ATA" and at the same time the distinctive feature pattern for "ATA" is registered. However, the speaker, by reproducing the contents of the temporary storage device by means of the speaker 15, is able to know that an unsatisfactory result has been registered.

Figure 4:
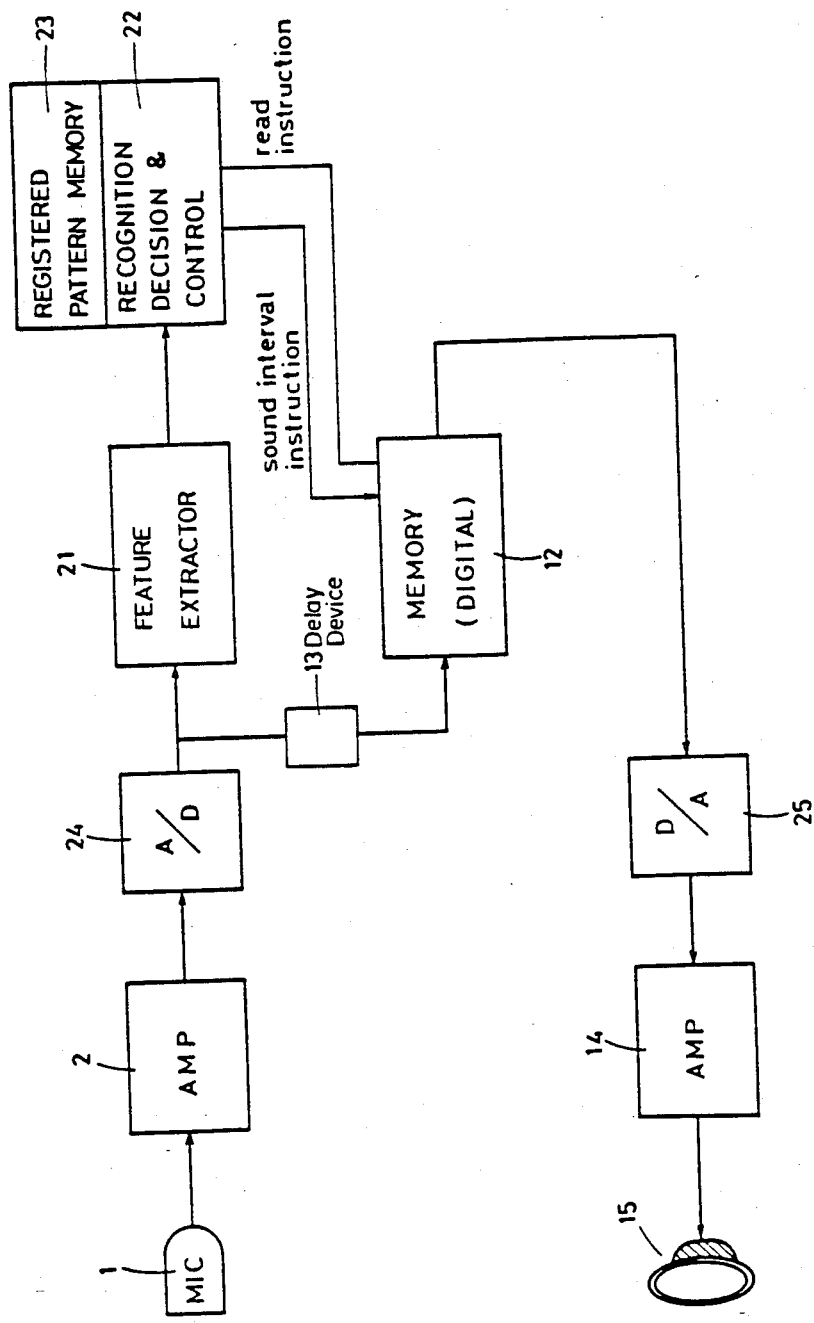

FIG. 4 shows a block diagram of a alternative embodiment of the apparatus according to the present invention, which comprises a microphone 1, an amplifier 2, a temporary storage device (digital memory) 12, a delay device 13, an amplifier 14, a speaker 15, a distinctive feature extraction section 21, a recognition/decision/control section 22, a registered pattern memory 23, an AD transducer section 24, and a DA transducer section 25. In accordance with a uniform program, with a determined formula, recognition, decision, and control of spoken words are carried out in the section 22, and at the same time that the voice interval decision is being made in the distinctive feature extraction 21, the distinctive feature pattern is extracted, converted to code (parameters), and stored in the memory 23. At this time, in the AD transducer section 24, the voice interval of the voice signal is converted from analogue to digital and the interval data which has been evaluated, is stored in the temporary storage 12, and the final spoken data results, through the DA transducer section 245, send back the voice signal, and inform the speaker through the speaker 15. From this operation, the speaker can verify whether or not the speech registered in the apparatus is the speech which was intended to be registered.

In addition, FIG. 5 shows an embodiment in which an analogue memory is used as the temporary storage device 12, and the operation is exactly the same as the one depicted in FIG. 4.

The invention being thus described, it will be obvious that the same may be varied in many ways. Such variations are not to be regarded as a departure from the spirit and scope of the invention, and all such modifications are intended to be included within the scope of the following claims.

What is claimed is:

1. In a speech recognition system having input means for inputting a speaker's words; analyzing means for analyzing and converting the distinctive features of that speaker's method of speech into a distinctive features pattern; memory means for storing the distinctive features; and comparison means for comparing voice patterns to be recognized with previously stored reference patterns, an improvement comprising: memory means for temporarily storing the input voice data and its time interval and; reproduction means controlled by the time interval for audibly outputting the input voice data so that the speaker can determine whether his intended speech was correctly patterned and stored timewise by the recognition system.

2. An improvement as in claim 1, wherein said memory means for temporary storage of voice data stores analog data in accordance with registered (stored) voice intervals.

3. An improvement as in claim 1, wherein said memory means for temporary storage of voice data stores digital data in accordance with registered (stored) voice intervals and said reproduction means includes a D/A converter.

* * * * *